(12) United States Patent
Meure et al.

(10) Patent No.: US 11,203,176 B2
(45) Date of Patent: Dec. 21, 2021

(54) MULTI-LAYER PLIES FOR IMPROVED COMPOSITE PERFORMANCE

(71) Applicant: THE BOEING COMPANY, Chicago, IL (US)

(72) Inventors: Samuel James Meure, Heatherton (AU); Kelsi Hurley, Kent, WA (US); Mark Stewart Wilenski, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 98 days.

(21) Appl. No.: 16/706,930

(22) Filed: Dec. 9, 2019

(65) Prior Publication Data
US 2020/0114616 A1    Apr. 16, 2020

Related U.S. Application Data

(62) Division of application No. 14/553,656, filed on Nov. 25, 2014.

(51) Int. Cl.
*B32B 3/18*        (2006.01)
*B32B 27/12*       (2006.01)
(Continued)

(52) U.S. Cl.
CPC .................. *B32B 3/18* (2013.01); *B32B 3/28* (2013.01); *B32B 5/02* (2013.01); *B32B 5/12* (2013.01);
(Continued)

(58) Field of Classification Search
CPC ......... Y02T 50/43; Y02T 50/433; B64C 3/20; B32B 5/12; B32B 5/22; B32B 5/24;
(Continued)

(56) References Cited

U.S. PATENT DOCUMENTS 2,830,926 A   4/1958  Bailey
3,703,422 A   11/1972 Yoshino
(Continued)

FOREIGN PATENT DOCUMENTS

EP   0441519 A1   8/1991
EP   2168745 A1   3/2010
(Continued)

OTHER PUBLICATIONS

Technical Reference Guide on 3M Nextel Ceramic Fibers and Textiles, 2016, obtained from http://multimedia.3m.com/mws/media/1327055O/3m-nextel-technical-reference-guide.pdf. Retrieved on Dec. 6, 2017.
(Continued)

*Primary Examiner* — Z. Jim Yang
(74) *Attorney, Agent, or Firm* — Marshall, Gerstein & Borun LLP

(57) ABSTRACT

A ply for fabricating composite material includes a first tow of a plurality of fibers, which are spread in a direction along a width of a cross section of the ply, wherein a first sheet of enhanced performance material overlies the first tow. A second tow of a plurality of fibers, which are spread in the direction along the width of the cross section of the ply, overlies the first sheet of the enhanced performance material. Another tow of a plurality of fibers, which are spread in the direction along the width of the cross section of the ply, are positioned against and laterally extend from the first tow, the second tow and the first sheet of enhanced performance material.

24 Claims, 4 Drawing Sheets

(51) Int. Cl.
  *B32B 3/28* (2006.01)
  *B32B 5/26* (2006.01)
  *B32B 27/28* (2006.01)
  *B32B 27/34* (2006.01)
  *B32B 5/02* (2006.01)
  *B32B 7/02* (2019.01)
  *B32B 5/12* (2006.01)

(52) U.S. Cl.
  CPC ............... *B32B 5/26* (2013.01); *B32B 7/02* (2013.01); *B32B 27/12* (2013.01); *B32B 27/281* (2013.01); *B32B 27/285* (2013.01); *B32B 27/286* (2013.01); *B32B 27/288* (2013.01); *B32B 27/34* (2013.01); *B32B 2250/40* (2013.01); *B32B 2250/44* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/558* (2013.01); *Y10T 428/24628* (2015.01); *Y10T 428/24994* (2015.04)

(58) Field of Classification Search
  CPC ......... B32B 5/26; B32B 3/10; B32B 3/12–18; B32B 3/22; Y10T 428/24994–249952; Y10T 428/24628–24727; B29C 70/06–088; B29C 70/10; B29C 70/16–24
  See application file for complete search history.

(56) References Cited

U.S. PATENT DOCUMENTS

| | | | |
|---|---|---|---|
| 3,755,059 | A | 8/1973 | Calfee |
| 3,756,905 | A | 9/1973 | Mills et al. |
| 3,762,977 | A | 10/1973 | Langfeldt |
| 4,079,568 | A | 3/1978 | Wortman |
| 4,320,160 | A | 3/1982 | Nishimura et al. |
| 4,464,429 | A | 8/1984 | Michaud-Soret |
| 4,617,217 | A | 10/1986 | Michaud-Soret |
| 4,726,707 | A | 2/1988 | Newton |
| 5,490,602 | A | 2/1996 | Wilson et al. |
| 2008/0241443 | A1 | 10/2008 | Liu et al. |
| 2009/0155524 | A1 | 6/2009 | Rapp et al. |
| 2010/0104819 | A1 | 4/2010 | Wadley et al. |
| 2011/0104471 | A1* | 5/2011 | Weisberg ............... B29C 70/32 428/222 |
| 2011/0294387 | A1 | 12/2011 | Simmons et al. |
| 2012/0090265 | A1 | 4/2012 | McCarville et al. |
| 2014/0044914 | A1 | 2/2014 | Kurtz et al. |
| 2014/0295725 | A1 | 10/2014 | Passmann et al. |
| 2014/0301856 | A1 | 10/2014 | Oldroyd et al. |
| 2016/0076179 | A1 | 3/2016 | Witte et al. |
| 2017/0008262 | A1 | 1/2017 | Tonomori et al. |

FOREIGN PATENT DOCUMENTS

| | | |
|---|---|---|
| GB | 2471318 A | 12/2010 |
| JP | H03222734 A | 10/1991 |
| JP | 2004530039 A | 9/2004 |
| JP | 2005305783 A | 11/2005 |
| JP | 2005349752 A | 12/2005 |
| JP | 2007273530 A | 10/2007 |
| JP | 2008506562 A | 3/2008 |
| JP | 2009034969 A | 2/2009 |
| JP | 2010532280 A | 10/2010 |
| JP | 2011068020 A | 4/2011 |
| JP | 2012530838 A | 12/2012 |
| JP | 2013531707 A | 8/2013 |
| WO | WO-02101319 A1 | 12/2002 |
| WO | WO-2005028200 A1 | 3/2005 |
| WO | WO-2006008529 A1 | 1/2006 |
| WO | WO-2008137218 A1 | 11/2008 |
| WO | WO-2011148237 A1 | 12/2011 |

OTHER PUBLICATIONS

Extended European Search Report for EP Application No. 15195859.2 dated Apr. 12, 2016.
European Examination Report for EP Application No. 15 195 859.2 dated Apr. 3, 2017.
Chinese Office Action for CN Application No. 2015108274451 dated Apr. 3, 2019.
Office Action for JP Application No. 2015-163590 dated Jun. 10, 2019, 8 pgs.
Notice of Reasons for Rejection dated Dec. 23, 2019 for JP Application No. 2015-163590.

* cited by examiner

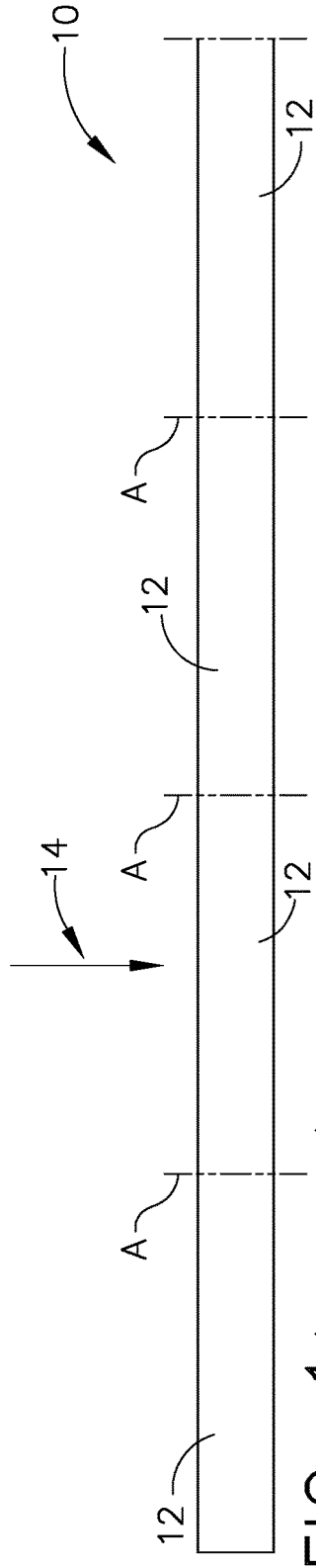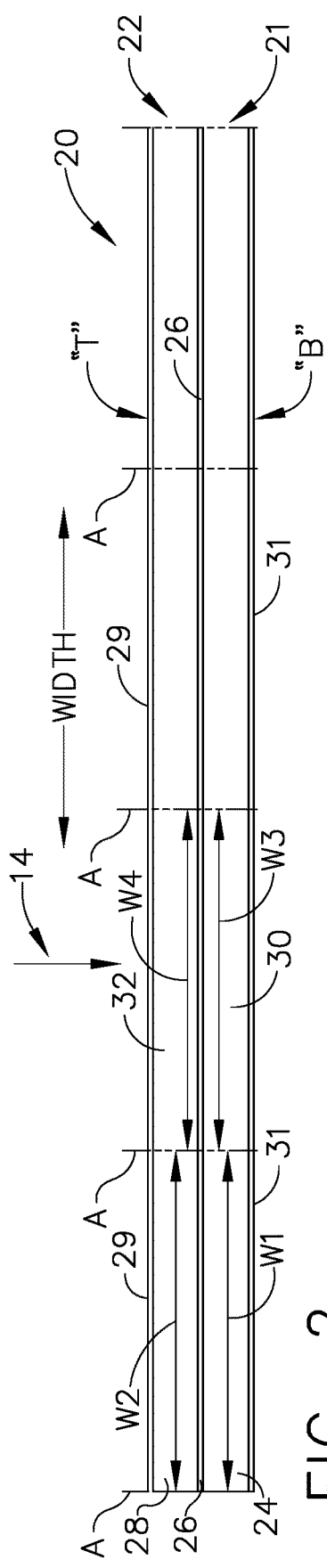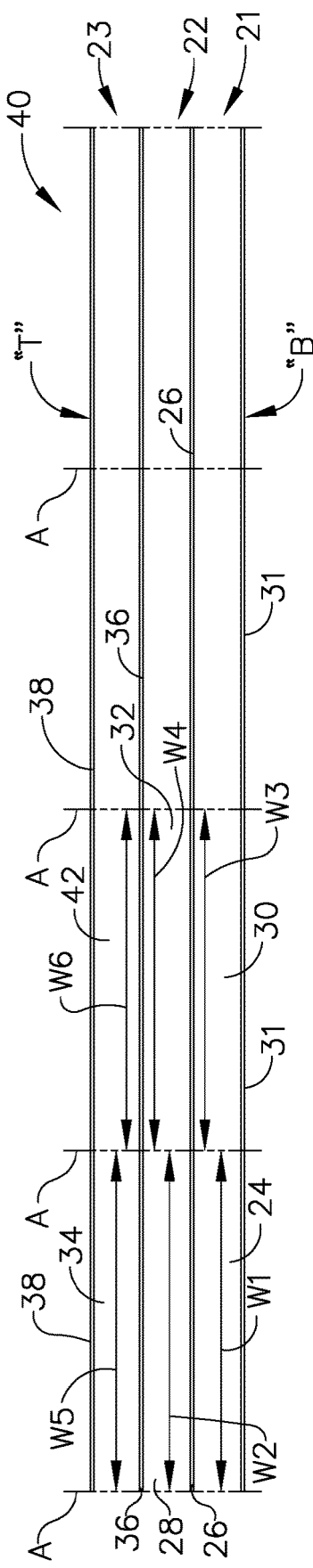

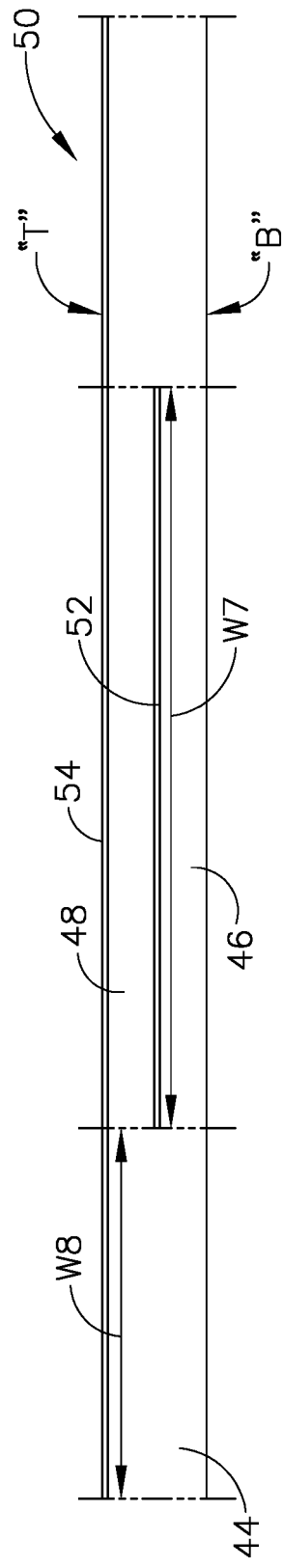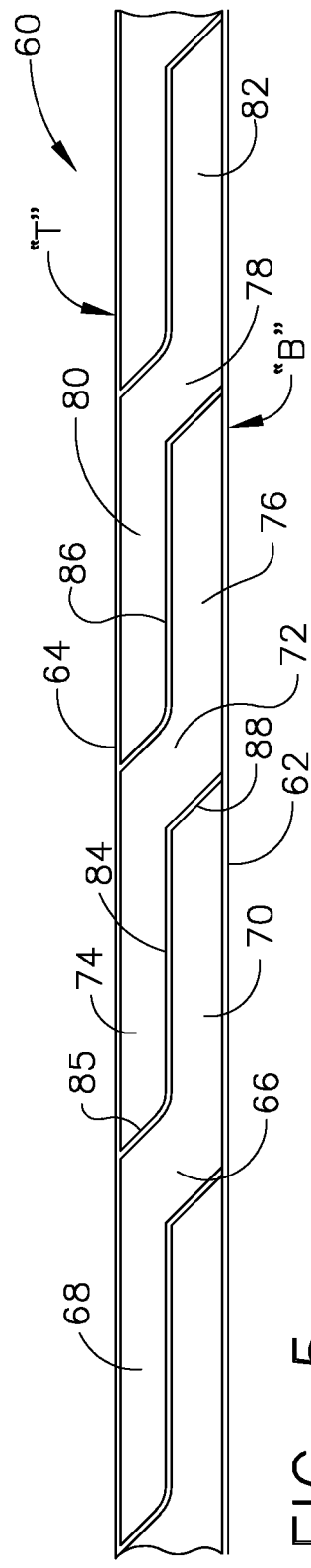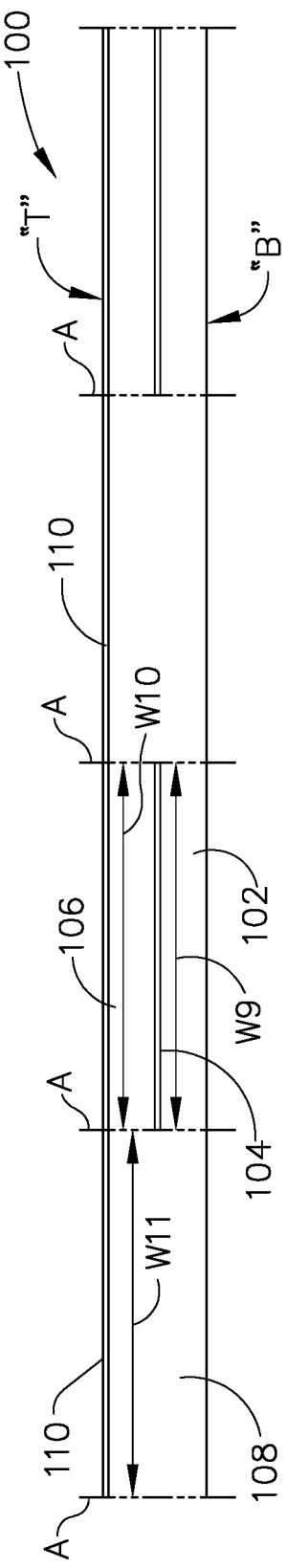

MULTI-LAYER PLIES FOR IMPROVED COMPOSITE PERFORMANCE

CROSS-REFERENCE TO RELATED APPLICATION

This application is a divisional of U.S. patent application Ser. No. 14/553,656, entitled "Multi-Layer Plies for Improved Composite Performance" and filed Nov. 25, 2014, the entire disclosure of which is incorporated by reference herein.

FIELD

This present disclosure generally relates to the configuration of a ply in the fabrication of a composite material, and more particularly, to the arrangement of the fibers within a ply.

BACKGROUND

In the fabrication of composite structures, plies are made and thereafter joined or bonded together to make a final composite product. A first example method of bonding plies into a composite product may include pre-impregnating plies of various fiber forms (e.g., fiber tows, unidirectional tape, woven fabric, braided fibers, etc.) with a resin mixture and then laying up these prepreg composite plies to form a composite layup. A second example method of bonding plies into a composite may include laying up dry fiber plies/preforms and then infusing the at least part of the ply stack/preform with resin. In both the first and second examples, individual plies may be oriented at different angles such as 0°, ±20°, ±30°, ±45°, ±60° or ±90° to control the strength, modulus and other mechanical properties of the composite in multiple directions. Current plies used in the fabrication of composite products are typically, approximately 0.0075 inches in thickness per ply. At times, a distinct layer of toughener material is positioned to overlie the outside of the ply to enhance the performance of that ply.

It has been seen that benefits to micro-crack resistance and mechanical performance occur when thinner plies are used. However, these benefits come with a significant cost particularly with respect to the time to manufacture. Thinner plies are constructed using standard layup processes. However, if, for example, the thinner ply to be fabricated is one half the thickness of the typical ply, twice the linear amount of plies would need to be produced to achieve the final thickness, which results in double the manufacturing laydown time and cost.

In the present process for fabricating composite materials, plies are made by spreading fiber tows to a width that will provide the desired final ply thickness. These spread fiber tows are arranged side by side during the manufacturing process resulting in a uniform fiber bed wherein the separate fiber tows are no longer distinct. With a uniform fiber bed being created, it is difficult to provide through thickness or z-direction performance. Z-direction performance has been enhanced in the past by adding through thickness stitching, z-pins and adding toughener materials between plies. These methods tend to increase cost in manufacturing and the complexity of material, as well as, arming other performance attributes such as increasing micro-cracking propensity, reducing open hole compression, etc.

There is also a need for in-plane performance enhancement. Enhancing in-plane performance has been accomplished by using plies having fibers positioned or oriented in different angular positions relative to other plies in that composite material construction. Additionally, in-plane enhanced performance has been addressed by adding materials such as thermoplastic tougheners, veils, filaments, films and particles between plies when assembling the composite material product.

There is a need to stabilize fibers within a tow when assembling the ply. UD tapes have been previously stabilized by controlling the viscosity and tack of the resin as well as through the use of binders/2D veil combinations in dry fiber formats.

SUMMARY

An example includes a ply for fabricating composite material, which includes a first tow of a plurality of fibers, which are spread in a direction along a width of a cross section of the ply, wherein a first sheet of enhanced performance material overlies the first tow. A second tow of a plurality of fibers, which are spread in the direction along the width of the cross section of the ply, overlies the first sheet of the enhanced performance material. The ply for fabricating composite material also includes another tow of a plurality of fibers, which are spread in the direction along the width of the cross section of the ply, are positioned against and laterally extend from the first tow, the second tow and the first sheet of enhanced performance material.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1 is a schematic of a cross section of a ply of the prior art;

FIG. 2 is a schematic of a cross section of an example of a ply for fabricating composite material;

FIG. 3 is a schematic of a cross section of a second example of a ply for fabricating composite material;

FIG. 4 is a schematic of a cross section of a third example of a ply for fabricating composite material;

FIG. 5 is a schematic of a cross section of a fourth example of a ply for fabricating composite material;

FIG. 6 is a schematic of a cross section of a fifth example of a ply for fabricating composite material;

DESCRIPTION

Figure 7:
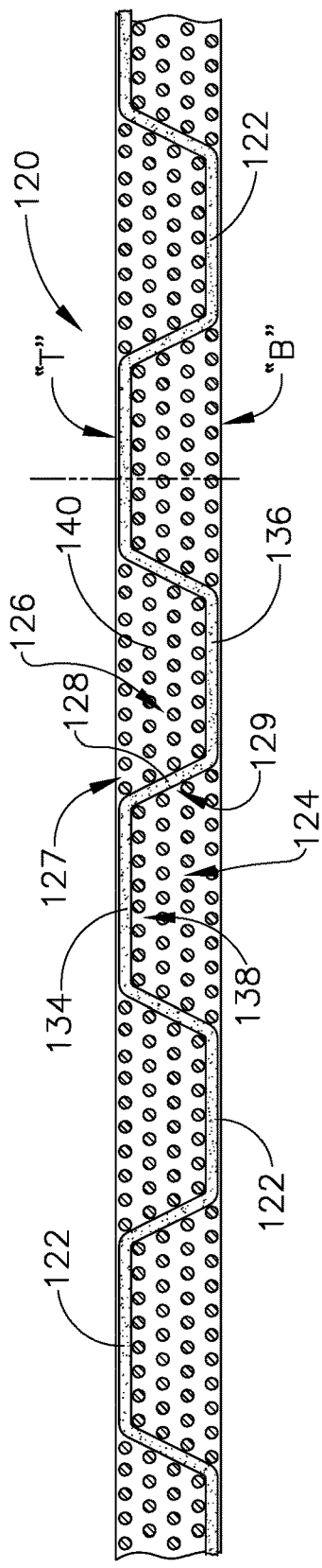
FIG. 7 is a schematic of a cross section of a sixth example of a ply for fabricating composite material.

In referring to FIG. 1, a cross section of a ply 10 is shown of the prior art. Ply 10 has been fabricated with laying down fibers on a standard prepregger and constructing ply 10 to approximately a thickness of 0.0075 inches. A tow of fibers 12 typically include a bundle of untwisted fibers of a preset quantity of fibers. These bundle of fibers, or tows, are indicated as being positioned between lines designated by "A" along the cross section of ply 10. These tows were laid down on the prepregger side by side. Each tow of fibers 12 were spread to a width to achieve a desired thickness for the ply. Tows of fibers come in a wide selection of fiber counts.

For example, a tow may contain 1,000; 3,000; 6,000; 12,000; 24,000 or 50,000 fibers or the like.

In this prior art example, tows 12 were placed side by side forming a unified fiber bed thereby eliminating separate and distinct fiber beds. This construction, made the fabrication of plies more difficult and more expensive to provide z-direction or through thickness performance of ply 10, as indicated by the direction of arrow 14. To add z-direction performance to ply 10, the production of ply 10 would require more cost and complexity by adding such items as through thickness stitching, adding z-pins or on occasions, adding sheets of toughener material positioned between plies in assembling a composite material. As there is a need to accomplish more performance in the z-direction, there is also a need to accomplish more in-plane performance of ply 10, as well.

It has been found that thinner plies would more successfully provide micro-crack resistance and enhance mechanical performance of assembled composite material. However, to fabricate a thinner ply would increase manufacturing cost, particularly with increased manufacturing time. For example, to accomplish a desired thickness with using thinner plies, additional linear amounts of the thinner ply would need to be made and then joined or bonded together to achieve the desired thickness. This additional lay down of fibers in manufacturing the additional linear amount of ply adds to the cost of manufacturing.

Fibers have been previously stabilized in the fabrication of ply 10 by controlling the viscosity and tack of the resin and through the use of binders/2D veil combinations in dry fiber formats. These approaches to stabilization of fibers also adds cost to the manufacturing of ply 10.

In referring to FIG. 2, the cross section shown of a ply 20 is an example of the construction of a ply which will provide the benefit of micro-crack resistance and mechanical performance provided by thinner plies that would be joined together. A ply consists of a fiber bed which may or may not have resin and may or may not have an enhancement layer. A ply is the bulk material from which a laminate is made. Instead of fabricating more linear amounts of thinner plies, ply 20 provides the benefit of micro-crack resistance and mechanical performance with the construction of sub-layers, such as, 21 and 22 within ply 20 itself. These plies will be useful in fabricating components in aerospace technology as well as other technologies which employ composite materials. This construction avoids the extra time for laying down additional amounts of thinner plies. The various embodiments of sub-layers described herein can be replicated in a thickness or vertical direction within a cross section of a ply and these sub-layers can also be extended laterally through a width dimension of the ply. Ply 20 for fabricating composite material includes a plurality of fibers spread in a direction along a width of a cross section of ply 20 and a first sheet 26 of enhanced performance material positioned between a top "T" and a bottom "B" of the cross section of ply 20, examples of which, will be discussed in further detail below.

Multi-layered construction of ply 20, with a standard or increased overall thickness can, under the construction shown in FIG. 2, provide micro-crack resistance and mechanical performance without costly additional laydown procedures being used for fabricating additional thinner plies. Moreover, additional materials, as will be discussed in more detail herein, can be positioned between the different layers of fibers and enhance various desirable performances to the ply such as, toughness, damage tolerance, off-axis tensile performance, conductivity, flame, smoke and toxicity emission reduction, etc.

As mentioned above, in fabrication of plies, quantities of fibers are used in terms of tows of fibers. Tows contain a predetermined quantity of fibers which include 1,000 fibers in a tow to as many as 50,000 fibers in a tow or more. The fibers contained within a tow are made of a material, from a selection of materials such as carbon, or aramid or glass or the like. The embodiments discussed herein will, unless otherwise specified, contain 6,000 fibers constructed of carbon. However, tows of other sizes and fibers of other compositions may be used to construct the plies herein. Different or the same sized tows and different or the same fibers compositions may be used in the construction of a ply.

In the example shown in FIG. 2, ply 20 is seen in cross section wherein the plurality of fibers are associated with tows, such as, for example, a first tow 24 of fibers and a second tow 28 of fibers. The plurality of fibers in the tows are seen as ends of the fibers from this view, and as mentioned above, are spread in a direction along the width of the cross section of ply 20. As mentioned earlier, lines identified as "A" indicate the approximate location of opposing ends of a tow that has been laid down on the prepregger or preform fabricating device which have been spread in a direction across the width of the cross section ply 20. The direction of the width dimension of the cross section of ply 20 is indicated by "Width" with the associated arrows as shown in FIG. 2. This width direction applies to all examples shown and discussed herein.

In this example, first tow 24 contains 6,000 fibers and first tow 24 has been spread along the width of the cross section of ply 20 to approximately one half the thickness of ply 20. The thickness of ply 20, in this example, is approximately 0.0075 inches. A first sheet of enhanced performance material 26, which will be discussed in more detail below, is positioned to overlie the plurality of fibers of first tow 24. First tow 24 is positioned between bottom "B" of the cross section of ply 20 and first sheet 26 of enhanced performance material. A second tow 28 of fibers is also positioned spread out in a direction along the width of the cross section of ply 20 and is positioned between the top "T" of ply 20 and first sheet 26 of enhanced performance material.

In further referring to the embodiment in FIG. 2, first tow 24 of fibers are spread to a width dimension "W1" wherein the first sheet 26 of enhanced performance material overlies and extends the width dimension "W1" of first tow 24 of fibers. The second tow 28 of fibers overlie the first sheet 26 of enhanced performance material and the first tow 24 and are spread to a width dimension "W2" having substantially the same width dimension as the width dimension W1 of first tow 24. In this example, width dimension "W1" of first tow 24 of fibers and width dimension "W2" of second tow 28 of fibers are positioned coextensive with each other. Positions of ends of tows 24 and 28 are indicated by the positions represented by lines identified as "A" positioning ends of tows 24 and 28 substantially vertically aligned in this cross section of ply 20.

As can be seen, in FIG. 2, first sheet of enhanced performance material 26 separates first tow 24 and second tow 28, forming sub-layers 21 and 22, respectively within ply 20. In this embodiment, top sheet 29 of enhanced performance material is positioned to overlie second tow 28 of fibers. This top sheet 29 of enhanced performance material extends along the top "T" of the cross section of ply 20 in a direction along the width of the cross section of ply 20 and in this embodiment across the top "T" of cross section of ply 20. First sheet 26 of enhanced performance material extends along the width of the cross section of ply 20. Bottom sheet 31 of enhanced performance material, in this embodiment, is positioned to extend along bottom "B" of cross section of ply 20, underlying first tow 24 of fibers and extending along the width of ply 20.

The thickness of enhanced performance sheets can be the same or vary in thickness within ply 20 as well as in other plies described herein. For this example, in ply 20, top sheet 29 and bottom sheet 31 are each one-half the thickness of first sheet 26 of enhanced performance material. Additionally, enhanced performance sheets, such as sheets 26, 29 and 31, in FIG. 2, can each be selected from a variety of materials to suit the particular functionality needed for that ply. For example, sheets 26, 29 and 31 can all be constructed of the same material or each can be constructed of a different material. Also, sheets such as 26, 29 and 31 can be selectively constructed of materials such as, for example, two of the sheets may be constructed of the same material etc. For purposes of the examples described herein, each sheet of enhanced performance materials can be selected from a variety of materials as will be discussed below.

In instances, when it is desired for resin material to migrate through an enhanced performance sheet during processing, a veil material may be useful which inherently has open space for this migration. Other materials, such as films do not have openings or open space and holes or other features may be provided in these materials, to permit migration of the resin.

Similarly, with respect to the tows described in the various examples herein, the plurality of fibers for each tow can be selected to be constructed of a particular material from a variety of materials. These materials include carbon, aramids, or glass or the like. As a result, each tow can be selected to be constructed of one of these materials which results in obtaining a variety of selected configurations with respect to the fiber content within a ply.

In referring to first sheet 26 of enhanced performance material, for example, as well as other sheets of enhanced performance material described in various examples herein, there is a wide variety of enhanced performance materials to choose from to use as a material for the ply so as to perform a desired enhanced performance function within the ply and the composite material.

These enhanced functionalities may include, for example, a material, which enhances toughness to the composite material. This material may include for example, thermoplastic materials such as nylons, polyurethanes, polyaryletherketones (such as PEEK, PEK, PEKK, etc.), polyethersulphone (PES), polysulfone, polyphenylsulfone (PPSU), polyimides, polyetherimides, polyamide-imides, or the like. It may also include thermoset materials such as toughened epoxies, polyurethanes, benzoxazines, or any other material that imparts high toughness.

The functionality enhancement may include a material, for example, which enhances off-axis tensile performance such as the toughening materials noted above plus higher strength and/or failure strain thermoset or thermoplastic materials.

The functionality enhancement may include a material, for example that is conductive such as carbon fiber mats, metallic components, carbon nanotubes, graphene sheets, or any other conductive materials. These conductive materials may be located within an appropriate thermoplastic or thermoset material of a variety of geometrical forms.

The functionality enhancement may include a material, for example, which provides a low fire, smoke, and toxicity level to the composite material. This material may include thermoset materials such as benzoxazines, phenolics, specialized epoxies, cyanate esters or the like. The material may also include high performance thermoplastic resins such as polyaryletherketones (such as PEEK, PEK, PEKK, etc.), polyethersulphone (PES), polysulfone, polyphenylsulfone (PPSU), polyimides, polyetherimides, polyamide-imides, or the like. The material may still yet include the mentioned materials that contain other material that enhance FST performance, such as inorganic materials like glasses and ceramics, or high char yield or ablative materials.

As it will become further understood herein, enhanced performance functionality will be fabricated within plies and thereby into the composite material assembled from such plies. This enhanced performance functionality will be provided in-plane with respect to the ply as well as in the z-direction or through thickness of the ply.

Further referring to FIG. 2, another first tow 30 of fibers is spread in the direction along the width of the cross section of ply 20. In this example, a width dimension "W3:" of another first tow 30 has substantially the same width dimension as the width dimension W1 of the plurality of fibers of the first tow 24. Another first tow 30 extends in substantially the same direction as the first tow 24 of fibers. Another first tow 30 of fibers is positioned laterally from and against first tow 24 of fibers in ply 20.

Another second tow 32 of fibers is spread in the direction along the width of the cross section of the ply 20. Width dimension "W4" of another second tow 32 of fibers has substantially the same width dimension as the width dimension "W3" of another first tow 30 of fibers. Another second tow 32 of fibers extends in substantially the same direction as the another first tow 30 of fibers and with another second tow 32 of fibers positioned laterally from and against second tow 28 of fibers. First sheet 26 of enhanced performance material extends in a direction along the width of the cross section of ply 20 to overlie another first tow 30 of fibers. First sheet 26 extends the width dimension of another first tow 30 of fibers. As can be seen, sheet 26 of enhanced performance material extends between sub-layers 21 and 22 of tows across the entire cross section, of this example.

This extension of sheet 26 of enhanced performance material can, for example, provide in-plane conductivity, toughness, flame, smoke and toxic reduction etc. or other performance enhancement. Another second tow 32 of fibers overlies sheet 26 of enhanced performance material and another first tow 30 of fibers. In this example, width dimension "W3" of the another first tow 30 of fibers and the width dimension "W4" of another second tow 32 of fibers are positioned coextensive with each other. As similarly mentioned above, opposing ends of tows 30 and 32, as indicated by the lines identified as "A", are substantially vertically aligned in this cross section of ply 20. Again, as discussed earlier, top sheet 29 of enhanced performance material and bottom sheet 31 of enhanced performance material each extend along the width of ply 20. Top sheet 29 of enhanced performance material overlies tows 28 and 32 and continues to extend across the width of ply 20. Bottom sheet 31 of enhanced performance material underlies tows 24 and 30 and continues to extend across width of ply 20.

Sub-layer 21 is formed with first tow 24 along with additional tows positioned laterally aligned with tows 24 and 30 across ply 20. Similarly, sub-layer 22 is formed with second tow 28 and another second tow 32 along with additional tows positioned laterally aligned with tows 28 and 32 across ply 20. Each of sub-layers 21 and 22 can have the same or different thicknesses. The fibers within one sub-layer can be the same as the fibers in the other sub-layer or they could be different. As discussed earlier, the fibers of each tow are selected from the variety of materials discussed herein. These variety of features for sub-layers 21 and 22 apply to other sub-layers discussed in other embodiments herein wherein the thickness of the sub-layer and the composition of the fibers within each of the tows within a sub-layer can each be selected.

In referring to FIG. 3 a second example is shown, which includes, a third tow 34 of fibers are spread in the direction along the width of the cross section of the ply 40. In this example, an additional sub-layer 23 is being added to the example discussed above in FIG. 2. The tows which extend laterally from tow 34 of fibers across width of ply 40 form sub-layer 23. Ply 40, in this example, includes three sub-layers, 21, 22 and 23. The components that are the same for the embodiments shown in FIGS. 2 and 3 will have the same number designation. Third tow 34 is positioned to overlie the plurality of fibers of second tow 28 with the width dimension "W5" of third tow 34 of fibers having substantially the same width dimension "W2" of second tow 28 of fibers. A second sheet 36 of enhanced performance material is positioned to overlie second tow 28 of fibers and is positioned between third tow 34 of fibers and second tow 28 of fibers. Width dimension "W5" of the plurality of fibers of third tow 34 and width dimension "W2" of the plurality of fibers of second tow 28 are positioned coextensive with each other. This can be seen as indicated by the lines identified as "A" identifying opposing ends of the respective tows. Second sheet of enhanced performance material 36 extends across the width dimension "W5" of third tow 34 and width dimension "W2" of second tow 28 of fibers. As is shown, in FIG. 3, a top sheet 38 of enhanced performance material 38 is positioned to extend along the top "T" of ply 40 to overlie third tow 34 of fibers. In this example, and extends across the cross section of ply 40 overlying the tows in sub-layer 23. First sheet 26 and second sheet 36 of enhanced performance materials also extend across the width of ply 40. Additionally in this example, sheet 31 of enhanced performance material is positioned to extend along the bottom "B" of ply 40 underlying first tow 24 of fibers and extends across ply 40 underlying the tows in sub-layer 21.

In further referring to FIG. 3, another stack of tows 30, 32 and 42 are shown positioned adjacent to the stack of tows 26, 28 and 34. The another stack of tows 30, 32 and 42, to be described, will add laterally to sub-layers 21, 22 and 23, respectively of ply 40. A plurality of fibers of another first tow 30 are spread in a direction along the width of the cross section of ply 40 to a width dimension "W3" having substantially the same width dimension as width dimension W1 of the plurality of fibers of first tow 24. The plurality of fibers of another first tow 30 extend in substantially the same direction as plurality of fibers of first tow 24 and with another first tow 30 positioned laterally from and against first tow 24.

A plurality of fibers of another second tow 32 are spread in a direction along the width of the cross section of ply 40 and overlie another first tow 30, wherein another second tow 32 has a width dimension "W4" having substantially the same width dimension as width dimension "W3" of the plurality of fibers of another first tow 30, with the plurality of fibers of another second tow 32 extending in substantially the same direction as the plurality of fibers of second tow 28, and with another second tow 32 positioned laterally from and against second tow 28.

First sheet of enhanced performance material 26 extends in a direction along the width of the cross section of ply 40 and between another first and another second tows 30 and 32. The width dimension "W3", "W4" of another first tow 30 and another second tow 32, respectively, are positioned coextensive with each other. First sheet 26 of enhanced performance material extends the width of another first and another second tows 30 and 32 and continues to extend across the width of ply 40.

A plurality of fibers of another third tow 42 are spread in a direction along the width of the cross section of the ply 40 and overlie another second tow 32. Another third tow 42 has a width dimension "W6" having substantially the same width dimension as the width dimension "W4" of the plurality of fibers of another second tow 32. The plurality of fibers of another third tow 42 extends in substantially the same direction as the plurality of fibers of third tow 34 and with other third tow 42 positioned laterally from and against third tow 34.

Second sheet of enhanced performance material 36 extends in a direction along the width of the cross section of the ply 40 and between another second and another third tows 32 and 42. The width dimensions "W4", "W6" of another second tow 32 and another third tow 42 are positioned coextensive with each other. Second sheet of another enhanced performance material 36 extends the width of another second and another third tows, 32 and 42. Top sheet 38 of enhanced performance material extends across the top "T" of ply 40 and overlies another third tow 42 of fibers. Top sheet 38 of enhanced performance material, as well as, sheets 26 and 36 of enhanced performance material, in this example, extend across the width of the cross section of ply 40. Bottom sheet 31 of enhanced performance material extends along bottom "B" of ply 40 underlying first tow 24, another first tow 30 and across width of ply 40.

In referring to FIG. 4, a third example of ply 50 is shown in cross section. Another tow 44 of fibers includes a plurality of fibers spread in the direction along the width of the cross section of the ply 50. Another tow 44 is positioned laterally to and against first tow 46, second tow 48, and against first sheet 52 of enhanced performance material positioned between first tow 46 and second tow 48. The plurality of fibers of the another tow 44 extend in substantially the same direction as the plurality of fibers of the first tow 46 and the second tow 48. In this embodiment, first and second tows 46 and 48 have substantially twice the width dimension "W7" of another tow 44, which has the width dimension "W8". First, second and third tows 46, 48, 44 each have substantially the same number of fibers. In this example, top sheet 54 of enhanced performance material is positioned to extend along the top "T" of ply 50, to overlie another and second tows 44 and 48, and in this example to extend along the cross section of ply 50. Additionally, a sheet of enhanced performance material can be positioned to extend along bottom "B" of ply 50, to underlie first and another tows 46 and 44, respectively, and extend across ply 50.

In referring to FIG. 5, a fourth example of ply 60 is shown in cross section. A bottom sheet 62 of enhanced performance material extends in a direction along bottom "B" of ply 60 across the width of the cross section of ply 60 and a top sheet 64 of enhanced performance material extends in a direction along top "T" of ply 60 across the width of the cross section of the ply 60.

As seen in FIG. 5, a first tow 66 of fibers has a first portion 68, which extends along top sheet 64 of enhanced performance material and a second portion 70, which extends along bottom sheet 62 of enhanced performance material. First tow 66 is positioned between first sheet 84 of enhanced performance material, which is spaced apart along the width of the cross section of ply 60, from another sheet 83 of enhanced performance material. A second tow 72 of fibers has a first portion 74 which extends along top sheet 64 of enhanced performance material and a second portion 76, which extends along bottom sheet 62 of enhanced performance material. A third tow 78 of fibers has a first portion 80 which extends along top sheet 64 of enhanced performance material and a second portion 82, which extends along bottom sheet 62 of enhanced performance material. The first portion 74 of second tow 72 of fibers overlies the second portion 70 of the first tow 66 of fibers. The first portion 80 of third tow 78 of fibers overlies the second portion 76 of the second tow 72 of fibers. A first sheet 84 of enhanced performance material is positioned between the first tow 66 of fibers and the second tow 72 of fibers. A second sheet 86 of enhanced performance material is positioned between the second tow 72 of fibers and the third tow 78 of fibers.

First sheet 84 of enhanced performance material extends between top "T" and bottom "B" of ply 60. Similarly, another sheet 83 and second sheet 86 of enhanced performance material extends between top "T" and bottom "B" of ply 60. In this example, top sheet 64, which extends across top "T" and along the width of cross section of ply 60, contacts first sheet 84 of enhanced performance material, another sheet 83 of enhanced performance material, and second sheet 86 of enhanced performance material. Further in this example, bottom sheet 62 of enhanced performance material, which extends across bottom "B" and along the width of cross section of ply 60, contacts first sheet 84 of enhanced performance material, another sheet 83 of enhanced performance material and second sheet 86 of enhanced performance material.

As can be seen in FIG. 5, arrangement of first tow 66 of fibers and second tow 72 of fibers are adjacent to each other. At least a portion, or in this example, first portion 74 of tow 72 of fibers overlies at least a portion, in this example, second portion 70 of first tow 66. First sheet 84 of enhanced performance material is positioned between first tow 66 of fibers and second tow 72 of fibers. The positioning of first portion 74 of second tow 72 overlying second portion 70 of first tow 66 with first sheet 84 positioned between first and second portions 74 and 70, provides a sub-layer of fibers with first portion 74 and a second sub-layer of fibers with second portion 70, within ply 60.

First sheet 84 of enhanced performance material extends between top "T" and bottom "B" of ply 60, as mentioned above and as shown in this example in FIG. 5. This positioning of first sheet 84 of enhanced performance material provides functionality, as provided by that particular material of first sheet 84, in a through thickness or z-direction of ply 60. The thickness direction of this functionality is in contrast to, for example, bottom sheet 62 and top sheet 64 of enhanced performance material wherein the direction of functionality provided by the material of sheets 62 and 64 extends in a planar direction or across the width of the cross section of ply 60. Additionally, as shown in FIG. 5, portions 85 and 88 of first sheet 84 of enhanced performance material extend in a direction along the width of the cross section of ply 60 in angular relationship to at least one of the top "T" and bottom "B" of ply 60. These enhanced materials are used for a wide variety of functionalities as discussed earlier, such as, toughness, conductivity and flame, smoke and toxicity reduction etc.

In further referring to FIG. 5, first sheet 84 of enhanced performance material and another sheet 83 of enhanced performance material are spaced apart from one another in a direction along the width of cross section of ply 60. Both first and second sheets 84 and 83 extend between top "T" and bottom "B" of ply 60. First tow 66 of fibers is position between first and another sheets 84 and 83. Top sheet 64 of enhanced performance material is positioned to extend along top "T" of cross section of ply 60 and is in contact with first sheet 84 and another sheet 83 of enhanced performance material. Similarly, bottom sheet 62 of enhanced performance material is positioned to extend along bottom "B" of cross section of ply 60 and contacts first sheet and second sheet 84 and 83 of enhanced performance material. First tow 66 of fibers, in this example, are enclosed within or encased within the sheets of enhanced performance material 62, 84, 64, and 83 of ply 60.

In referring to FIG. 6, a fifth example is shown of ply 100. A first tow 102 of a plurality of fibers is spread to a width dimension "W9" in a direction along a width of a cross section of ply 100. A first sheet 104 of enhanced performance material is positioned to overlie first tow 102 of fibers and extends the width dimension "W9" of first tow 102 of fibers. A second tow 106 of a plurality of fibers across is spread in a direction along the width of the cross section of ply 100 to overlie first sheet 104 of enhanced performance material and first tow 102 of fibers. The plurality of fibers of second tow 106 are spread to a width dimension "W10" having substantially the same width dimension as width dimension "W9" of first tow 102 of fibers, wherein width dimension "W9" of the plurality of fibers of first tow 102 and width dimension "W10" of the plurality of fibers of second tow 106 are positioned coextensive with each other.

In FIG. 6, another tow 108 which includes a plurality of fibers spread in the direction along the width of the cross section of ply 100 is positioned laterally from and against first tow 102, second tow 106, and first sheet 104 of enhanced performance material. The plurality of fibers of another tow 108 extends in substantially the same direction as the plurality of fibers of first and second tows 102 and 106. Another tow 108 has approximately the same width dimension "W11" as the width dimensions of each "W9", "W10" of first and second tows 102 and 106, respectively. First and second tows 102 and 106 each have approximately one-half of the plurality of fibers of the another tow 108. Top sheet 110 of enhanced performance material is positioned overlying another tow 108 of fibers and second tow 106 of fibers. In this example, sheet 110 extends along the top "T" of the width of the cross section of ply 100 and overlies second tow 106 of fibers and another tow 108 of fibers. A bottom sheet of enhanced performance material, in this example, can be positioned to underlie first tow 102 and another tow 108 and extend along the bottom "B" of the width of the cross section of ply 100.

In referring to FIG. 7, a sixth example is shown of ply 120. First sheet 122 of enhanced performance material extends along a width of a cross section of ply 120. A first tow 124 of fibers is positioned to underlie sheet 122 of enhanced performance material and second tow 126 of fibers is positioned on an opposing side of sheet 122. In this example, at least a portion 127 of second tow 126 of fibers overlies at least a portion 129 of the first tow 124 of fibers. A portion 128 of first sheet 122 of enhanced performance material is positioned between portion 127 of second tow 126 and portion 129 of first tow 124. Portion 128 of first sheet 122 of enhanced performance material extends between bottom "B" of the cross section of ply 120 to top "T" of cross section of ply 120. With the extension of portion 128 of sheet 122 of enhanced performance material from bottom "B" to top "T" of ply 120, functionality of the material of sheet 122 is provided in the through thickness and z-direction of ply 120. In addition, portion 128 of sheet 122 of enhanced performance material also extends in a direction along a width of the cross section of ply 120 in angular relationship to at least one of the top "T" and bottom "B" of the cross section of ply 120.

In this example shown in FIG. 7, first tow 124 and second tow 126 are adjacent to one another with portion 128 of first sheet 122 of enhanced performance material positioned between first tow 124 of fibers and second tow 126 of fibers. A portion 127 of fibers of second tow 126 of fibers overlies portion 129 of fibers of first tow 124 of fibers, as discussed above. This configuration provides a sub-layer with portion 127 of fibers overlying another sub-layer formed by portion 129 of fibers of first tow 124 of fibers, with portion 128 of first sheet 122 of enhanced performance material positioned between portions 127 and 129 of fibers.

Portion 128 of first sheet 122 of enhanced performance material positioned at top "T" of the cross section of ply 120 has a first portion 134 of sheet 122 of enhanced performance material, which extends in a direction from portion 128 along top "T" of the cross section of ply 120 overlying first tow 124 of fibers. Portion 128, of sheet 122 of enhanced performance material positioned at bottom "B" of the cross section of ply 120, has second portion 136 of first sheet 122 of enhanced performance material, which extends in a direction from portion 128 along bottom "B" of cross section of ply 120 underlying second tow 126 of fibers.

First sheet of enhanced performance material 122, in one example, is constructed of a flexible sheet of material such as, a thermoplastic film, a non-woven veil, a woven veil, a continuous strand mat, a thermoset film, a carbon nanotube sheet or the like. These forms may be created using a single material type, or multiple material types, or even a modified material type. An example of a modified material type would be a thermoplastic material loaded with some carbon nanotubes or graphene platelets, etc. or the like. Thus, positioning tows 124 and 126 on opposing sides of first sheet 122 will create or form recessed portions 138 and 140. Recessed portion 138 faces open downwardly and recess portion 140 adjacent to recessed portion 138 faces open upwardly. Recesses 138 and 140 provide lateral support for tows 124 and 126, respectively. Recesses 138 and 140 confine and stabilize the plurality of fibers within each of tows 124 and 126 during the prepreg assembling process thereby reducing the need for further materials to stabilize the fibers or altering the consistency or content of the matrix. The recesses are scalable to receive more than one tow within each recess. Alternatively, sheet 120 can be pre-formed to take on a corrugated configuration providing preformed recesses 138 and 140 which would function similarly to stabilize tows 124 and 126 during the fabrication process. The preformed corrugated material would include thermoplastic film, a non-woven veil, a continuous strand mat, a thermoset film, carbon nanotube sheet, thermoplastic loaded with filaments, particles, etc. or the like.

This example is a cost effective method of adding desirable materials through use of first sheet 122 in constructing ply 120 to provide both z-direction and in-plane performance enhancement. As mentioned above, enhancements can include toughness, conductivity, flame, smoke and toxicity reduction, etc. In addition, this configuration of first sheet 122 at the same time provides stabilization of the plurality of fibers during fabrication with the confining recesses. Incorporation of the corrugated film or veil that binds/tacks to the tows will enable stabilization and minimal distortion of the UD tape without need for control of prepreg resin flow properties or through the uses of binders/2D veils in dry fibers.

Additionally, a top sheet of enhanced performance material (not shown) can be positioned to extend along top "T" of cross section of ply 120 and overlie, for example, second tow 126 of fibers positioned within recess 140 of first sheet 122 of enhanced performance material. Positioning a top sheet of enhanced performance material will encase fibers positioned within other similarly oriented recesses positioned along cross section of ply 120. Similarly, a bottom sheet of enhanced performance material (not shown) can be positioned to extend along bottom "B" of cross section of ply 120 and underlie, for example, first tow 124 of fibers positioned within recess 138 of sheet 122 of enhanced performance material. Positioning a bottom sheet of enhanced performance material will encase fibers positioned within other similarly oriented recesses positioned along cross section of ply 120.

Figure 8:
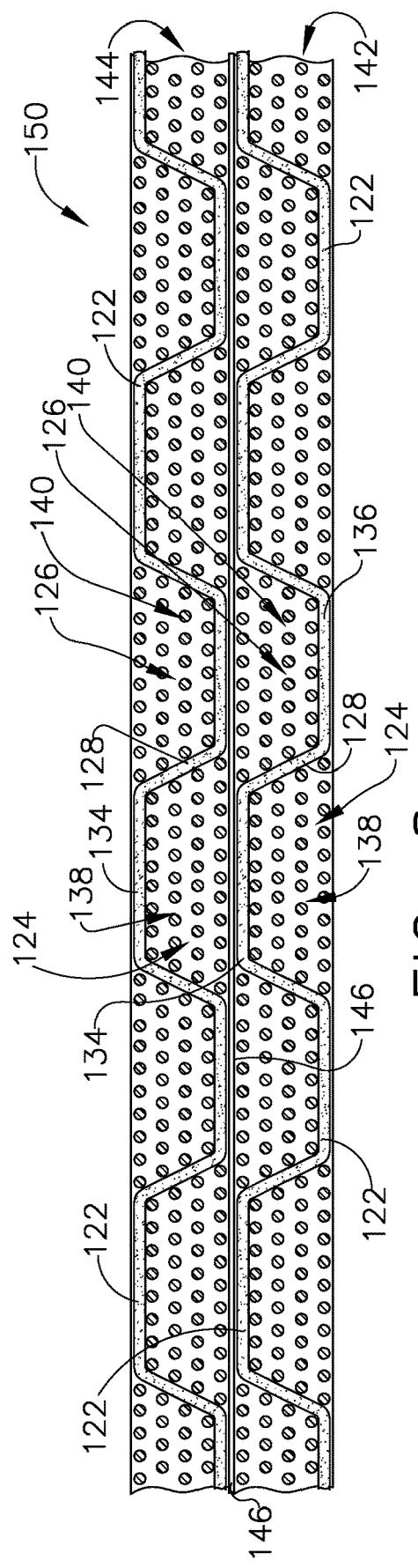
FIG. 8 is a schematic of a cross section of a seventh example of a ply for fabricating composite material.

In referring to FIG. 8, in this embodiment, the cross section of ply 150 has two sub-layers, first sub-layer 142 and second sub-layer 144 each having the construction of ply 120 described above for FIG. 7. The numbering of the components of each of first and second sub-layers 142 and 144 will have the same numbering as found and described above in FIG. 7. Second sub-layer 144 overlies first sub-layer 142. Ply 150, in this embodiment, includes a second sheet 146 of enhanced performance material positioned between first and second sub-layers 142 and 144. Second sheet 146 of enhanced performance material extends across width of ply 150. As described in earlier embodiments, other sheets of enhanced performance materials can be positioned to extend across top "T" of ply 150 and overlie second sub-layer 144 and positioned to extend across bottom "B" of ply 150 and underlie first sub-layer 142.

Figure 9:
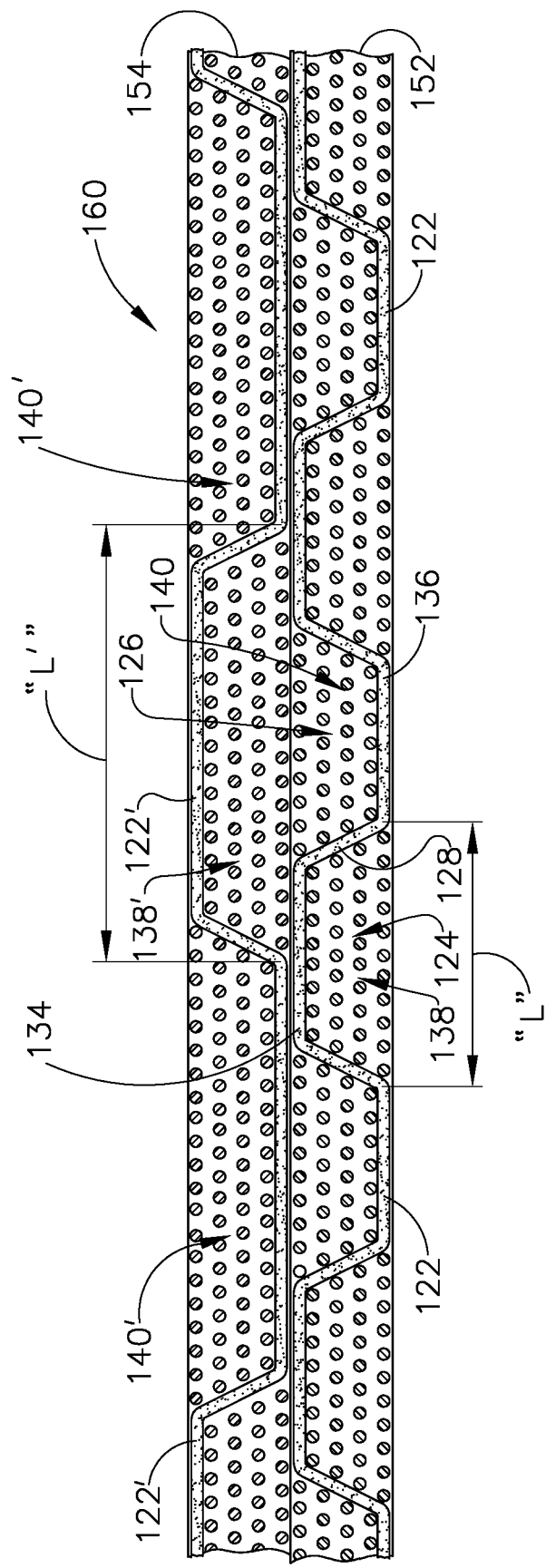
FIG. 9 is a schematic of a cross section of an eighth example of a ply for fabricating composite material.

Second sheet 146 of enhanced performance material encases tows of fibers positioned within, for example, recesses 138 and 140. In this example, second sheet 146 of enhanced performance material underlies recess 138 of second sub-layer 144 and overlies recess 140 of first sub-layer 142. This configuration of second sheet 146 extending across open portion of recesses positioned across cross section of ply 150, encases the plurality of fibers positioned within the respective recesses. In referring to FIG. 9, in this embodiment, the cross section of ply 160 has two sub-layers 152 and 154. Second sub-layer 154 overlies first sub-layer 152. First sub-layer 152, in this embodiment, has the same construction as the construction of ply 120 described above in FIG. 7. The numbering of the components of first sub-layer 152 will have the same numbering as found and described above in FIG. 7. Ply 160 does not include, in this example, any sheet of enhanced material, however, a sheet of enhanced material can be positioned between first and second sub-layers 152 and 154. Also, additional sheets of enhanced performance material can be positioned to overlie second sub-layer 154 and underlie first sub-layer 152.

With respect to second sub-layer 154, the corrugated structure is very similar to that of first sub-layer 152, however, the length "L'" of recess 138' of second sub-layer 154 is approximately twice the length of length "L" of recess 138 of first sub-layer 152. As a result of this elongated shaping of second sheet 122' of enhanced performance sheet of second sub-layer 154, which extends along the width of ply 160, recess 138' overlaps recess 140 of first sub-layer 152 and bridges across recess 140. This configuration of enhanced performance first sheet 122 and second sheet 122' provides a non-aligned or staggered relationship between recesses of each of first and second sub-layers 152 and 154 resulting in overlapping of the recesses, such as 138' over 140. Additionally, successive recesses 138' and 140' in second sub-layer 154, for example, each hold approximately twice the plurality of fibers held by each of successive recesses 138 and 140 of first sub-layer 152.

While various embodiments have been described above, this disclosure is not intended to be limited thereto. Variations can be made to the disclosed embodiments that are still within the scope of the appended claims.

What is claimed:

1. A ply for fabricating composite material, comprising:
a first tow comprising a plurality of fibers, wherein the plurality of fibers of the first tow are spread in a direction along a width of a cross section of the ply and a first sheet of enhanced performance material overlies the plurality of fibers of the first tow;
a second tow comprising a plurality of fibers, wherein the plurality of fibers of the second tow are spread in the direction along the width of the cross section of the ply and overlies the first sheet of enhanced performance material; and
another tow comprising a plurality of fibers, wherein the plurality of fibers of the other tow are spread in the direction along the width of the cross section of the ply and the plurality of fibers of the another tow are positioned against and laterally extend from the plurality of fibers of the first tow, the plurality of fibers of the second tow and the first sheet of enhanced performance material wherein:
the total number of the plurality of fibers contained in the first tow is equal to a total number of the plurality of fibers contained in the second tow;
the total number of the plurality of fibers contained in the first tow is equal to the total number of plurality of fibers contained in the another tow; and
the plurality of fibers of the first tow, wherein the plurality of fibers are spread in the direction along the width of the cross section of the ply and the plurality of fibers of the second tow, wherein the plurality of fibers are spread in the direction along the width of the cross section of the ply such that a width dimension of the plurality of fibers of the first tow and a width dimension of the plurality of the fibers of the second tow each have twice a width dimension of a width dimension of the plurality of fibers of the another tow spread in the direction along the width of the cross section of the play.

2. The ply of claim 1, wherein:
the plurality of fibers of the first tow contains one thousand (1000), three thousand (3000), six thousand (6000), twelve thousand (12000), twenty four thousand (24000) or fifty thousand (50,000) fibers;
the plurality of fibers of the second tow contains one thousand (1000), three thousand (3000), six thousand (6000), twelve thousand (12000), twenty four thousand (24000) or fifty thousand (50,000) fibers; and
the plurality of fibers of the another tow contains one thousand (1000), three thousand (3000), six thousand (6000), twelve thousand (12000), twenty four thousand (24000) or fifty thousand (50,000) fibers.

3. The ply of claim 1, wherein the plurality of fibers of the first tow and the plurality of fibers of the second tow each have a different fiber count than the fiber count of the another tow.

4. The ply of claim 1, wherein the first tow and second tow of fibers extend in a width dimension of the cross section of the ply having a different width dimension than the another tow which extends across the cross section of the ply.

5. The ply of claim 4, wherein the width dimension of the first tow and the second tow are coextensive with one another.

6. The ply of claim 1, wherein the plurality of fibers of the first tow, the plurality of fibers of the second tow, and the plurality of fibers of the another tow are composed of the same material or plurality of fibers of two tows of the first, second and another tows are composed of different materials.

7. The ply of claim 1, further includes a top sheet of enhanced performance material which overlies the plurality of fibers of the another tow and the plurality of fibers of the second tow.

8. The ply of claim 7, wherein the top sheet of enhance performance material extends along the width of the cross section of the ply.

9. The ply of claim 7, wherein the top sheet of enhanced performance material and the first sheet of enhanced performance material each have a thickness which is a same thickness.

10. The ply of claim 7, wherein the top sheet of enhanced performance material has a thickness which is different from a thickness of the first sheet of enhanced performance material.

11. The ply of claim 7, wherein the top sheet of enhanced performance material and the first sheet of enhanced performance material are constructed of a same material.

12. The ply of claim 7, wherein the top sheet of enhanced performance material is constructed of a material and the first sheet of enhanced performance material is constructed of a different material.

13. The ply of claim 7, wherein the top sheet of enhanced performance material is constructed of a veil material or from a film without openings and the first sheet of enhanced performance material is constructed of a veil material or a film without openings.

14. The ply of claim 1, further includes a bottom sheet of enhanced performance material, which underlies the plurality of fibers of the another tow and the plurality of fibers of the first tow.

15. The ply of claim 14 wherein the bottom sheet of enhanced performance material extends along the width of the cross section of the ply.

16. The ply of claim 14, wherein the bottom sheet of enhanced performance material and the first sheet of enhanced performance material each have a thickness which is a same thickness.

17. The ply of claim 14, wherein the bottom sheet of enhanced performance material has a thickness which is different from a thickness of the first sheet of enhanced performance material.

18. The ply of claim 14, wherein the bottom sheet of enhanced performance material and the first sheet of enhanced performance material are constructed of a same material.

19. The ply of claim 14, wherein the bottom sheet of enhanced performance material is constructed of a material and the first sheet of enhanced performance material is constructed of a different material.

20. The ply of claim 14, wherein the bottom sheet of enhanced performance material is constructed of a veil material or of a film without openings and the first sheet of enhanced performance material is constructed of a veil material or a film without openings.

21. The ply of claim 1, wherein the first sheet of enhanced performance material overlies the plurality of fibers of the first tow and the first sheet of enhanced performance material extends along the width of the cross section of the ply, and a top sheet of enhanced performance material overlies the plurality of fibers of the second tow and the top sheet of enhanced performance material extends along the width of the cross section of the ply, such that the first sheet of enhanced performance material and the top sheet of enhanced performance material are spaced apart from each other along the width of the cross section of the ply.

22. A ply for fabricating composite material, comprising:
a first tow comprising a plurality of fibers, wherein the plurality of fibers of the first tow are spread in a direction along a width of a cross section of the ply and a first sheet of enhanced performance material overlies the plurality of fibers of the first tow;
a second tow comprising of a plurality of fibers, wherein the plurality of fibers of the second tow are spread in the direction along the width of the cross section of the ply and overlies the first sheet of enhanced performance material; and
another tow comprising a plurality of fibers, wherein the plurality of fibers of the other tow are spread in the direction along the width of the cross section of the ply and the plurality of fibers of the another tow are positioned against and laterally extend from the plurality of fibers of the first tow, the plurality of fibers of the second tow and the first sheet of enhanced performance material wherein:
the plurality of fibers of the first tow has one-half of the plurality of fibers of the plurality of fibers of the another tow and the plurality of fibers of the second tow has one-half of the plurality of fibers of the plurality of fibers of the another tow; and
the plurality of fibers of the first tow and the plurality of fibers of the second tow are in direct contact with the plurality of fibers of the another tow.

23. The ply of claim 22, wherein the first tow of the plurality of fibers, the second tow of the plurality of fibers and the another tow of the plurality of fibers each have a same width dimension in the direction along the width of the cross section of the ply.

24. The ply of claim 22, wherein the first sheet of enhanced performance material overlies the plurality of fibers of the first tow and the first sheet of enhanced performance material extends along the width of the cross section of the ply, and a top sheet of enhanced performance material overlies the plurality of fibers of the second tow and the top sheet of enhanced performance material extends along the width of the cross section of the ply, such that the first sheet of enhanced performance material and the top sheet of enhanced performance material are spaced apart from each other along the width of the cross section of the ply.

* * * * *